United States Patent
Tanushev et al.

(10) Patent No.: US 12,147,003 B1
(45) Date of Patent: Nov. 19, 2024

(54) BEAM TOMOGRAPHY SYSTEMS AND METHODS

(71) Applicant: Z TERRA INC., Houston, TX (US)

(72) Inventors: Nicolay Tanushev, Houston, TX (US); Iulian F. Musat, Katy, TX (US); Ioan Sturzu, Houston, TX (US); Alexander M. Popovici, Katy, TX (US)

(73) Assignee: Z Terra, Inc., Houston, TX (US)

( * ) Notice: Subject to any disclaimer, the term of this patent is extended or adjusted under 35 U.S.C. 154(b) by 486 days.

(21) Appl. No.: 16/864,046

(22) Filed: Apr. 30, 2020

Related U.S. Application Data

(60) Provisional application No. 62/840,666, filed on Apr. 30, 2019.

(51) Int. Cl.
    *G01V 1/28* (2006.01)
    *G01V 1/30* (2006.01)
    *G01V 1/34* (2006.01)

(52) U.S. Cl.
    CPC .............. *G01V 1/282* (2013.01); *G01V 1/303* (2013.01); *G01V 1/345* (2013.01)

(58) Field of Classification Search
    CPC ......... G01V 1/282; G01V 1/303; G01V 1/345
    See application file for complete search history.

(56) References Cited

U.S. PATENT DOCUMENTS

| | | | | |
|---|---|---|---|---|
| 7,970,546 B1 * | 6/2011 | Peng | ...................... | G01V 1/282 702/16 |
| 9,594,176 B1 * | 3/2017 | Popovici | ................ | G01V 1/303 |
| 2011/0096627 A1 * | 4/2011 | Hill | ......................... | G01V 1/282 367/73 |
| 2012/0010820 A1 * | 1/2012 | Winbow | ................ | G01V 1/303 702/18 |
| 2014/0200813 A1 * | 7/2014 | Montel | .................. | G01V 1/303 702/14 |
| 2014/0278299 A1 * | 9/2014 | Hill | ......................... | G01V 1/303 703/2 |

(Continued)

OTHER PUBLICATIONS

Popovici, Alexander Mihai, et al. "Fast beam migration using plane wave destructor (PWD) beam forming." SPE Middle East Oil and Gas Show and Conference. SPE, 2013. (Year: 2013).*

(Continued)

*Primary Examiner* — Raymond L Nimox
(74) *Attorney, Agent, or Firm* — Law Office of Andrei D Popovici, PC

(57) ABSTRACT

In some embodiments, a velocity model for a seismic exploration subsurface volume is updated by beam tomography. A set of beams is generated from an input seismic data set, and a beam group is assembled for each beam. Each beam group includes the original beam and a set of related beams (if any). If no related beams are found for a given original beam, the original beam is discarded. The beams in a group are then aligned vertically (in depth or time), and a tomography matrix is assembled from the alignment adjustment values for the beams. The tomography matrix is used to perform a tomographic update of the velocity model, and the updated velocity model is used to generate an image of the subsurface volume. The described systems/methods allow efficiently generating accurate images of subsurface volumes, including in areas having complex geologic structures, allowing reduced image inaccuracies/artifacts.

21 Claims, 12 Drawing Sheets

(56) References Cited

U.S. PATENT DOCUMENTS

2018/0059276 A1* 3/2018 Roberts .................. G01V 1/362

OTHER PUBLICATIONS

Popovici, Alexander, Nick Tanushev, and Sean Hardesty. "High-resolution, wide-azimuth beam tomography for velocity model building." SEG International Exposition and Annual Meeting. SEG, 2016. (Year: 2016).*

Babich et al., Gaussian Summation Method (Review), downloaded from: https://www.researchgate.net/publication/243164978_Gaussian_summation_method_Review, Radiophysics and Quantum Electronics, 32(12): 1063-1081, Russia, Dec. 1989.

Bleistein et al., "Modeling, Migration and Inversion with Gaussian Beams, Revisited," 2007 SEG Annual Meeting, Soc. of Expl. Geophys., San Antonio, USA, Sep. 2007.

Fomel et al., "Time-domain Seismic Imaging Using Beams," SEG Houston 2009 International Exposition and Annual Meeting, Soc. of Expl. Geophys., Houston, USA, Oct. 2009.

Kravtsov et al., "Gaussian Beams in Inhomogeneous Media: A Review," Stud. Geophys. Geod., 51, 1-36, Prague, Jan. 2007.

Popov, "A New Method of Computation of Wave Fields Using Gaussian Beams," Wave Motion 4 85-97, North-Holland Publishing Company, Jan. 1982.

Popovici et al., "Fast Beam Migration Using Plane Wave Destructor (PWD) Beam Forming," 75th EAGE Conference & Exhibition incorporating SPE EUROPEC 2013, London, UK, Jun. 10-13, 2013.

Popovici et al., "High Resolution, Super Efficient Wide Azimuth Beam Tomography for Velocity Model Building," 78th EAGE Conference & Exhibition, Vienna, Austria, 30 May-Jun. 2, 2016.

Sherwood et al., "Efficient Beam Velocity Model Building with Tomography Designed to Accept 3d Residuals Aligning Depth Offset Gathers," 76th EAGE Conference & Exhibition, Amsterdam RAI, The Netherlands, Jun. 16-19, 2014.

Stork, "Reflection Tomography in the Postmigrated Domain," Geophysics, vol. 57, No. 5, p. 680-692, Soc. of Expl. Geophys., Tulsa, USA, May 1992.

* cited by examiner

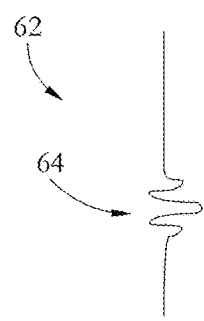
FIG. 3-A
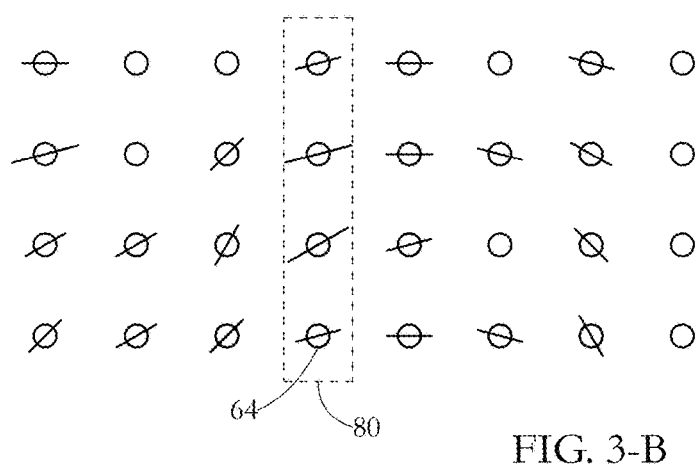
FIG. 3-B
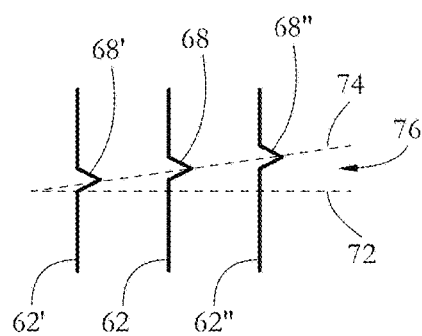
FIG. 3-C

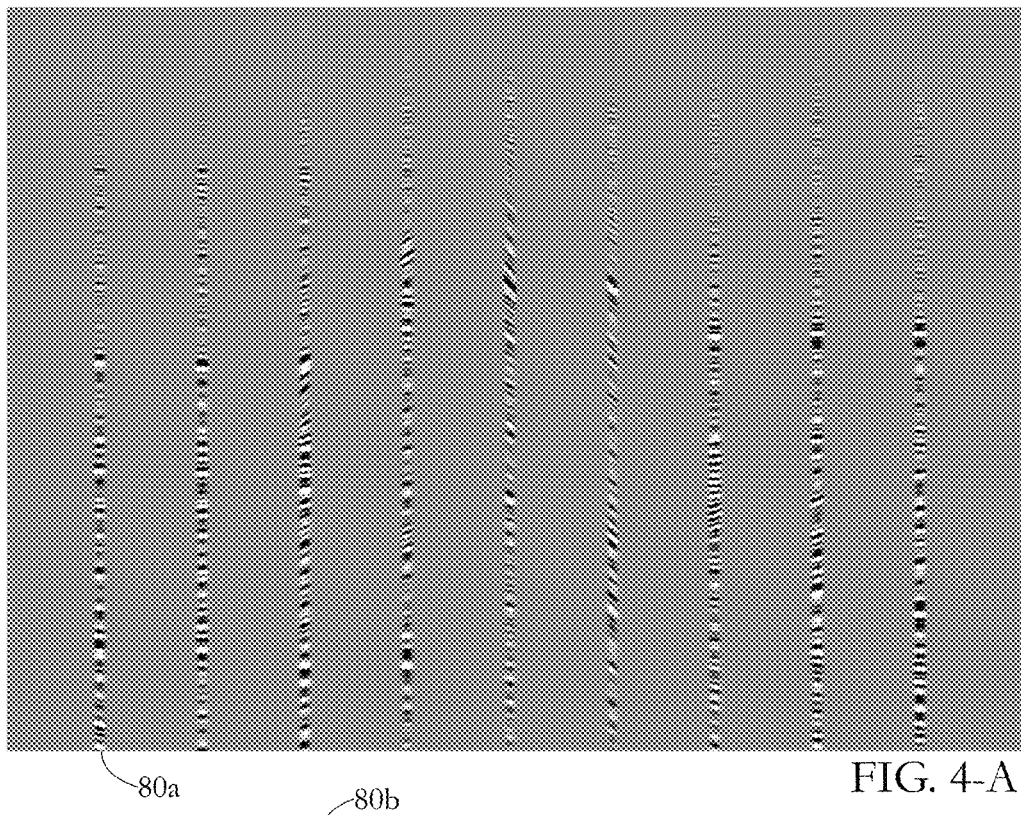
FIG. 4-A
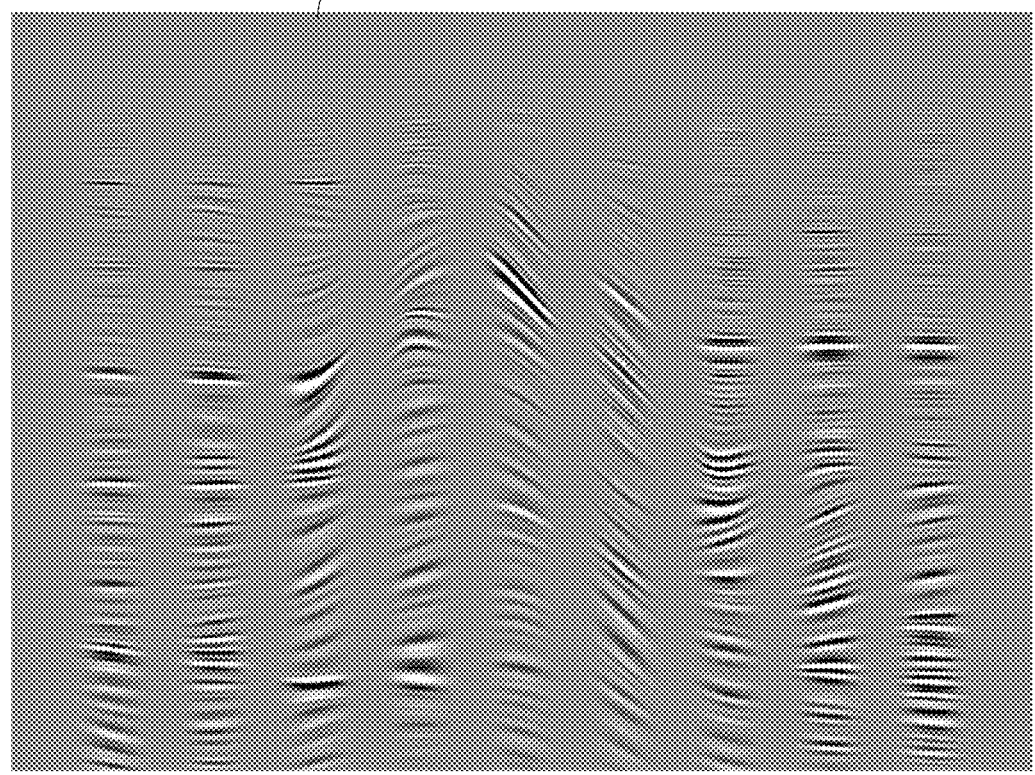
FIG. 4-B

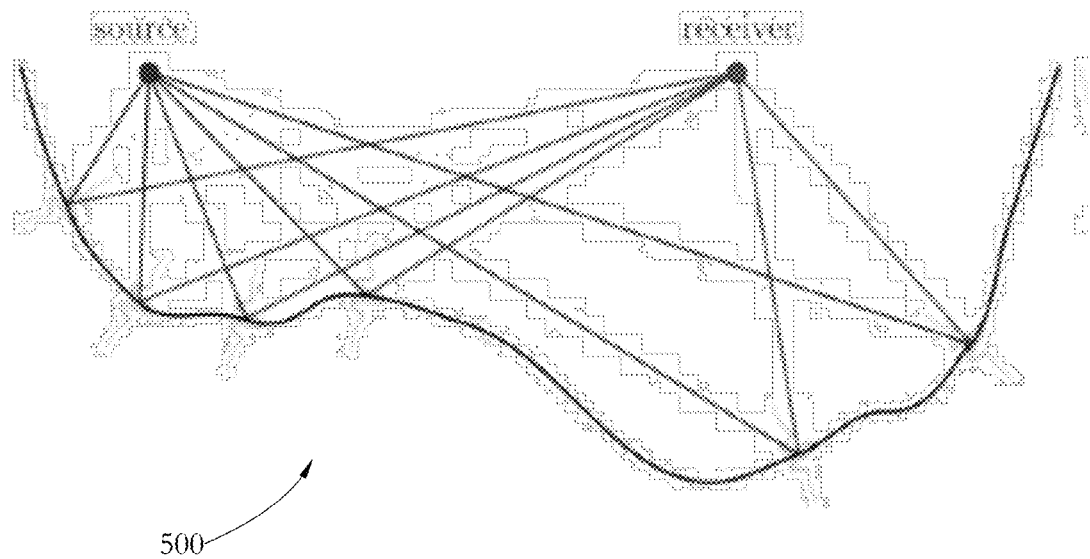
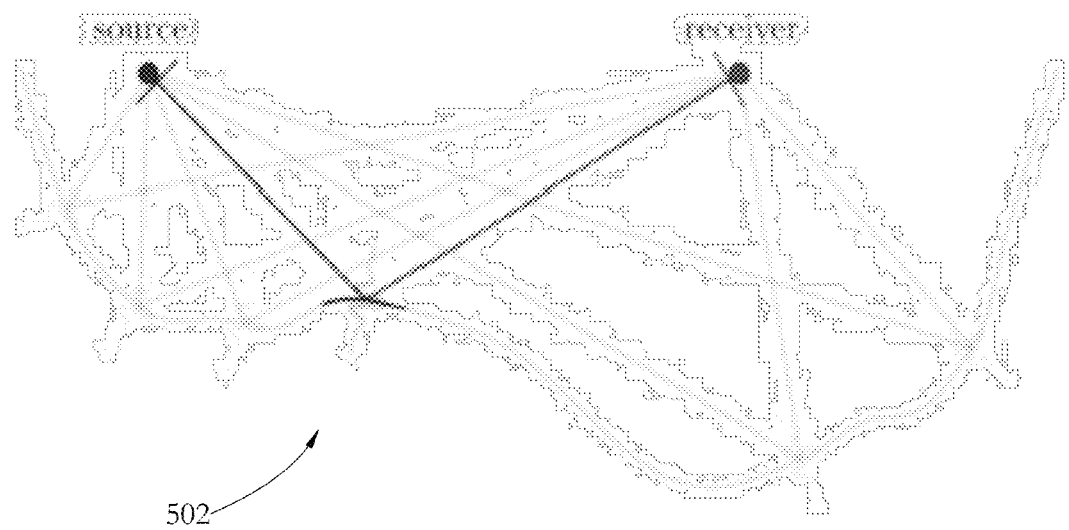
FIG. 5

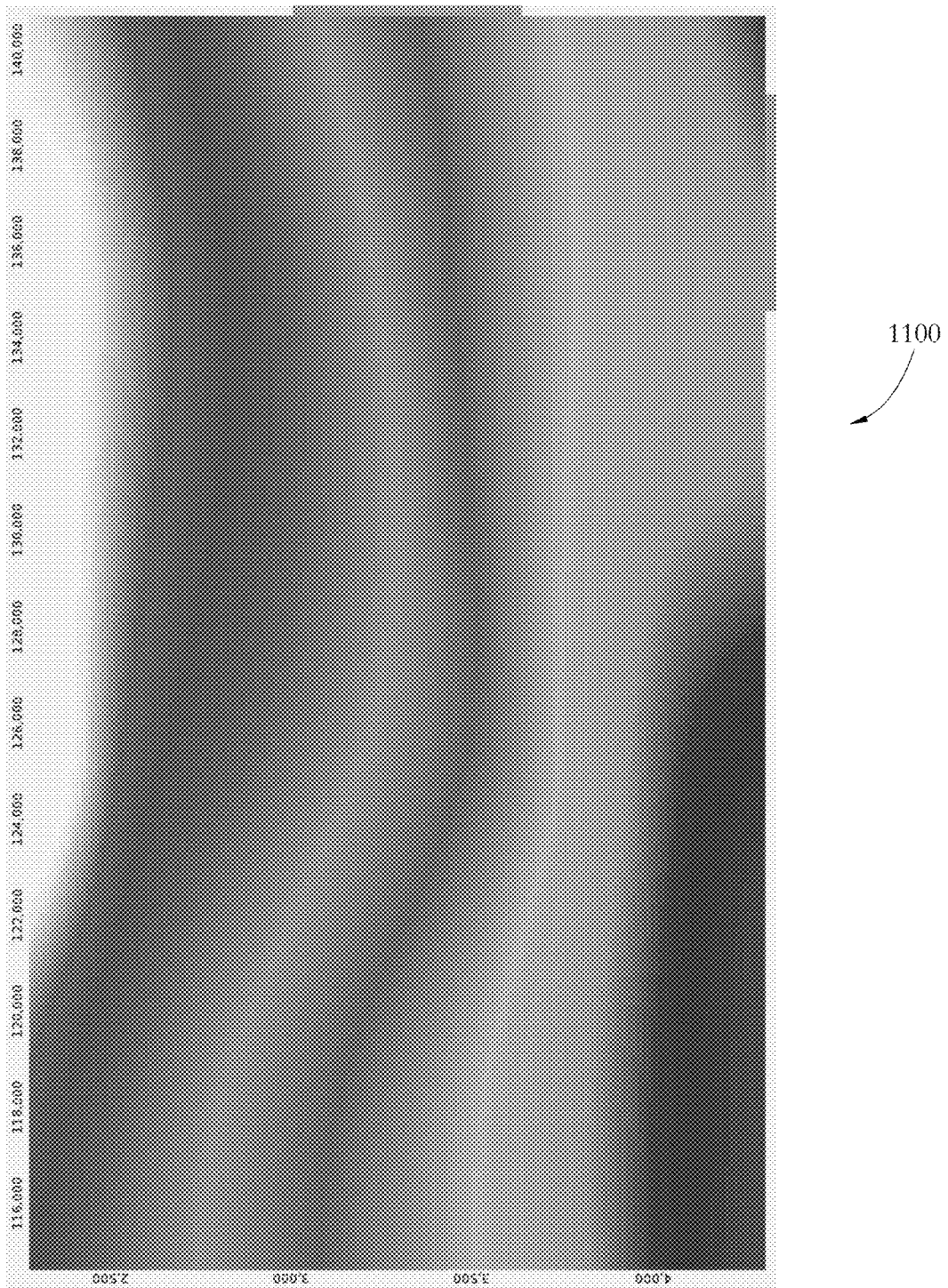
FIG. 11-A

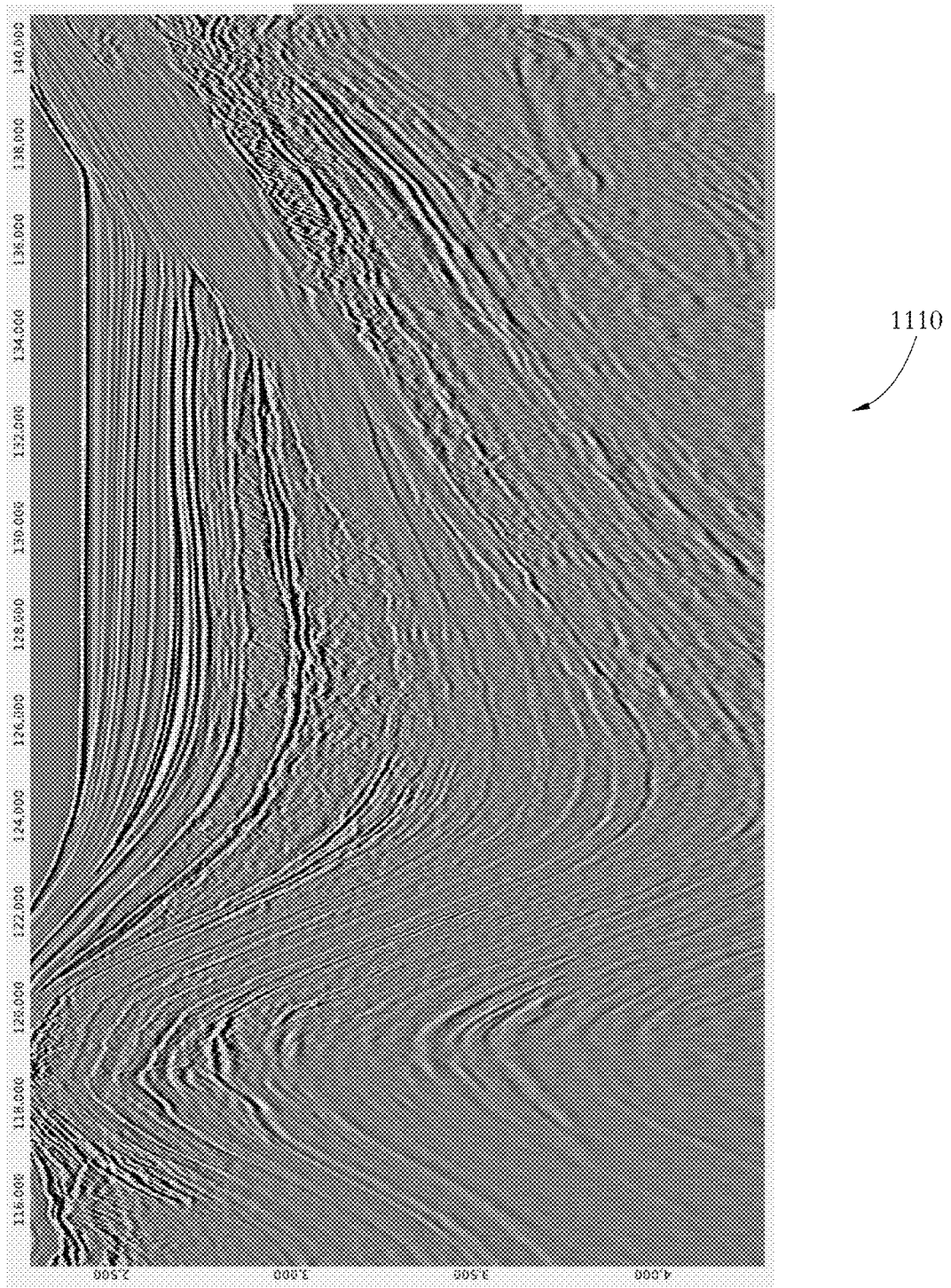
FIG. 11-B

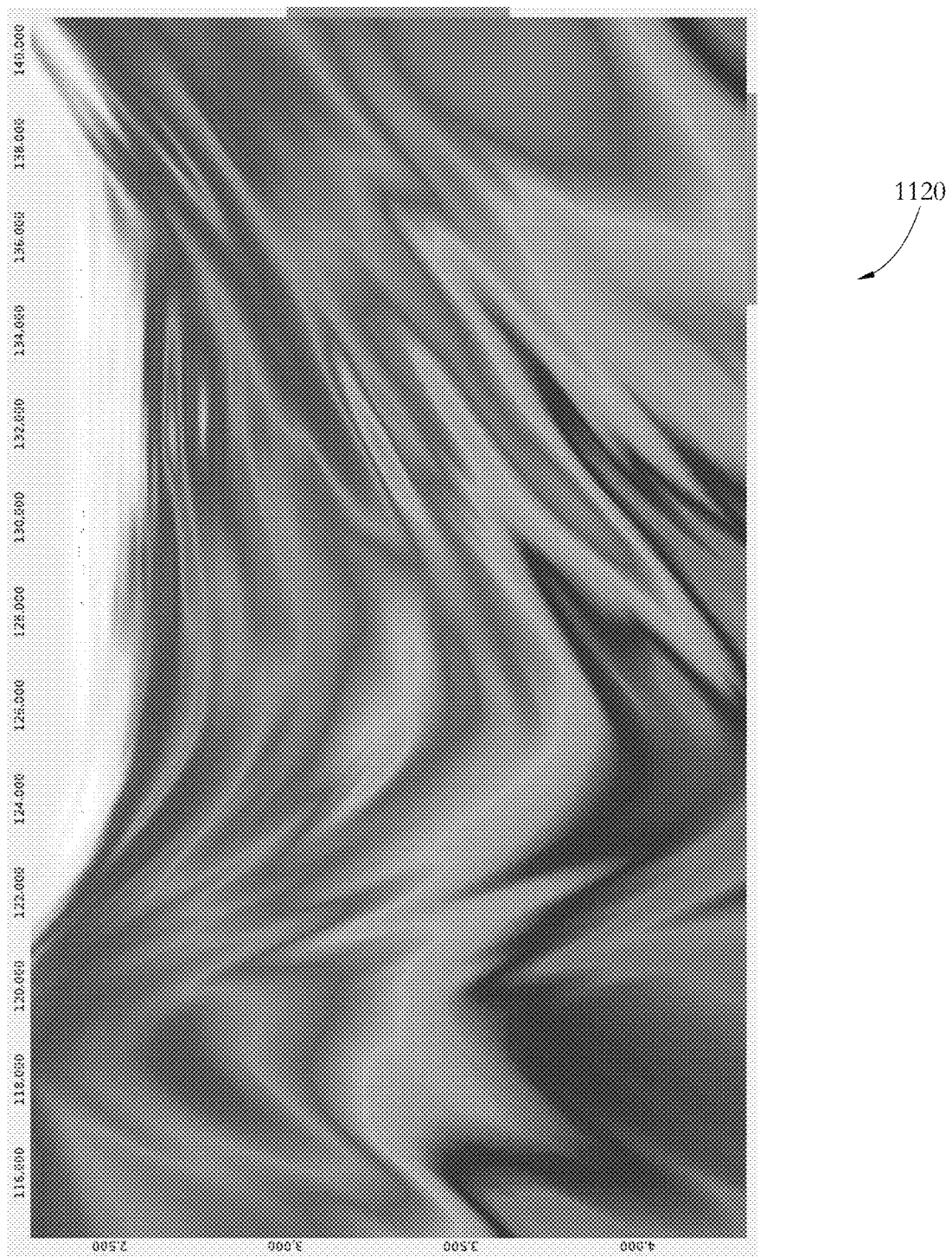
FIG. 11-C

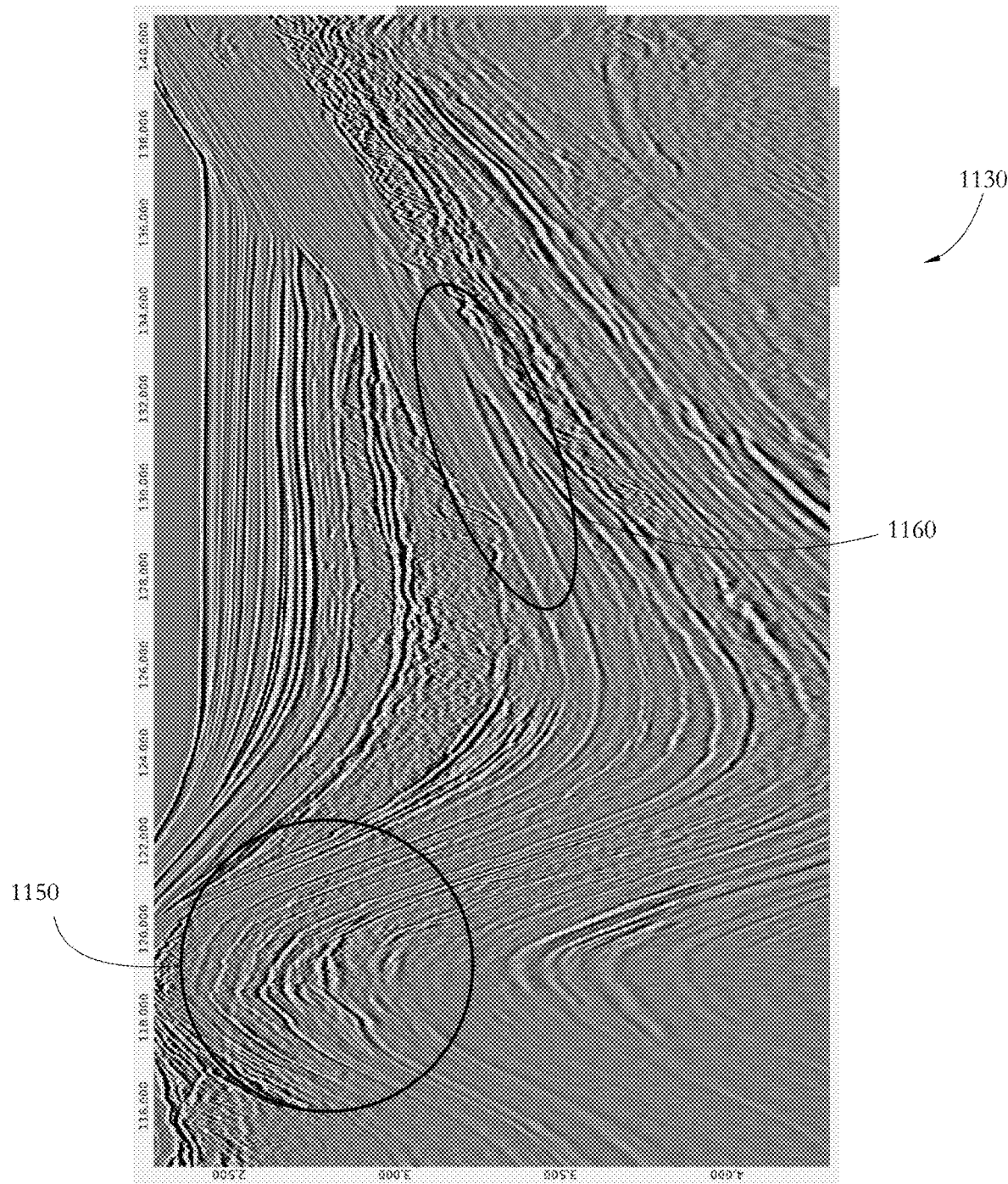
FIG. 11-D

BEAM TOMOGRAPHY SYSTEMS AND METHODS

RELATED APPLICATION DATA

This application claims the benefit of the filing date of U.S. Provisional Patent Application No. 62/840,666, filed Apr. 30, 2019, which is herein incorporated by reference.

BACKGROUND

The invention relates to systems and methods for geophysical data processing, and in particular to seismic imaging systems and methods.

Generating images of subsurface structures is a key component of the search for oil and gas deposits. Accurate imaging decreases the chances of drilling expensive dry wells, allowing a reduction in the cost of oil exploration and production, and a reduction in dependence on foreign oil. Seismic imaging undertakes to generate accurate images of subsurface structures given computing constraints, which are significant given the relatively large sizes of common seismic data sets. Generating accurate images is particularly challenging for complex geophysical structures, which is often where oil/gas deposits are found.

Kirchhoff migration methods are commonly used for seismic imaging. In Kirchhoff migration, the energy of an event on a trace is propagated to all possible reflection points in the model space. The propagation of the events may be done using methods that are generally related to Green's functions. Travel-time tables may be used to characterize the time of propagation from the source defined by the trace to the image point and/or further to the reflector point defined by the trace. After all events on all traces are propagated, an image is generated by stacking (summing) all individual contributions. Stacking reinforces in-phase energy corresponding to true reflectors, and cancels out-of-phase energy that does not correspond to a true reflector.

More recently, beam migration methods have been used to generate seismic images with improved efficiency and accuracy. In beam migration, an input seismic data set is used to generate a plurality of beams, and migration is then performed selectively on beam data, rather than by summing contributions from the entire volume.

The quality of generated seismic images depends on the accuracy of the seismic velocity model used to propagate events. Migration velocity analysis (MVA) is a known method of updating velocity models. In a common MVA method, common image gathers (CIG) are generated, and a velocity model update is performed according to whether the CIGs indicate parts of the velocity model include velocity values that are too high or too low.

Conventional imaging and velocity model update techniques can be suboptimal in their accuracy and/or computational efficiency, and may lead to velocity model and/or image inaccuracies/artifacts for given computational resource constraints.

SUMMARY

According to one aspect, a seismic data processing method comprises employing a computer system comprising at least one processor to: generate a plurality of seismic data beams according to seismic trace data characterizing a subsurface volume; for a selected beam of the plurality of beams, identify a beam group comprising the selected beam and a set of beams meeting a relatedness condition relative to the selected beam; determine a set of relative inter-beam time or depth shifts that align the beam group in time or depth; build a tomography matrix according to a plurality of relative inter-beam time or depth shifts determined for a plurality of corresponding beam groups; and perform a tomographic update of a velocity model characterizing the subsurface volume according to the tomography matrix to generate an updated velocity model for generating an seismic image of the subsurface volume.

According to another aspect, a non-transitory computer readable medium encodes instructions which, when executed by a computer system, cause the computer system to: generate a plurality of seismic data beams according to seismic trace data characterizing a subsurface volume; for a selected beam of the plurality of beams, identify a beam group comprising the selected beam and a set of beams meeting a relatedness condition relative to the selected beam; determine a set of relative inter-beam time or depth shifts that align the beam group in time or depth; build a tomography matrix according to a plurality of relative inter-beam time or depth shifts determined for a plurality of corresponding beam groups; and perform a tomographic update of a velocity model characterizing the subsurface volume according to the tomography matrix to generate an updated velocity model for generating an seismic image of the subsurface volume.

According to another aspect, a computer system comprises at least one processor programmed to: generate a plurality of seismic data beams according to seismic trace data characterizing a subsurface volume; for a selected beam of the plurality of beams, identify a beam group comprising the selected beam and a set of beams meeting a relatedness condition relative to the selected beam; determine a set of relative inter-beam time or depth shifts that align the beam group in time or depth; build a tomography matrix according to a plurality of relative inter-beam time or depth shifts determined for a plurality of corresponding beam groups; and perform a tomographic update of a velocity model characterizing the subsurface volume according to the tomography matrix to generate an updated velocity model for generating an seismic image of the subsurface volume.

BRIEF DESCRIPTION OF THE DRAWINGS

The foregoing aspects and advantages of the present invention will become better understood upon reading the following detailed description and upon reference to the drawings where:

FIG. 3-A illustrates an exemplary wavelet according to some embodiments of the present invention.

FIG. 3-B illustrates prestack data decomposition in locally-coherent events (wavelets) using plane-wave destructor (PWD) filters, and a corresponding dip for a locally-coherent event, according to some embodiments of the present invention.

FIG. 3-C illustrates an exemplary locally-coherent event (wavelet) characterized by a dip and curvature, according to some embodiments of the present invention.

FIGS. 4-A-B show exemplary seismic data beams according to some embodiments of the present invention.

FIG. 5 illustrates ray propagation employed in Kirchhoff and beam migration according to some embodiments of the present invention.

FIG. 11-A shows an exemplary initial velocity model according to some embodiments of the present invention.

FIG. 11-B shows an exemplary image generated by beam migration using the initial velocity model of FIG. 11-A, according to some embodiments of the present invention.

FIG. 11-C shows an exemplary updated velocity model generated by updating the initial velocity model of FIG. 11-A via several iterations of beam tomography, according to some embodiments of the present invention.

FIG. 11-D shows an exemplary image generated using the updated velocity model of FIG. 11-C, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, the term vertical refers to time, depth or both. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
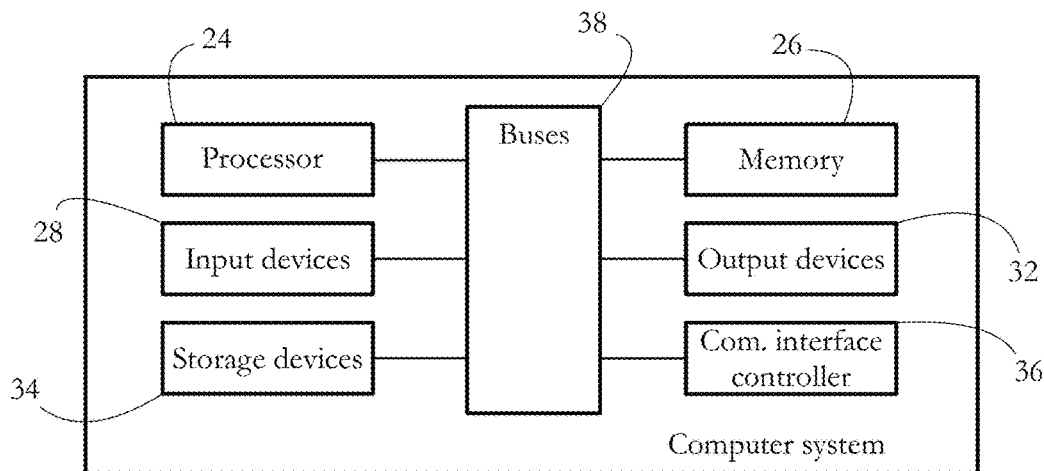
FIG. 1 shows an exemplary hardware configuration of a seismic data processing system according to some embodiments of the present invention.

FIG. 1 shows a hardware configuration of an exemplary computer system 20 according to some embodiments of the present invention. Computer system 20 comprises a processor 24 having one or more processing cores, a random access memory (RAM) 26, a set of input devices 28 (e.g. keyboard, mouse, touchpad), a set of output devices 32 (e.g. monitors, speakers), a set of storage devices 34 (e.g. hard disk drives, solid state drives), and a network interface controller 36, all connected to each other via a set of buses 38. System 20 may be used to implement seismic processing methods as described below.

Figure 2:
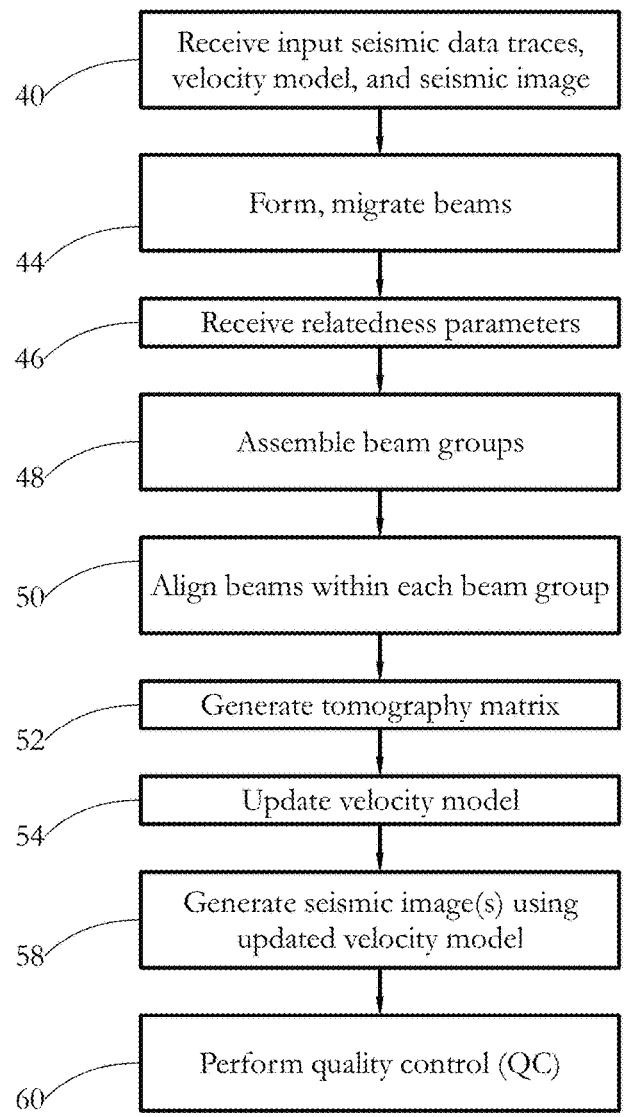
FIG. 2 shows a sequence of steps performed according to some embodiments of the present invention.

FIG. 2 illustrates a sequence of steps performed by a computer system including one or more computer systems 20 according to some embodiments of the present invention. In a step 40, an input data set is retrieved from storage and/or over a communications link. The input data set includes a plurality of input seismic data traces an associated subsurface seismic velocity model, and one or more images of the subsurface volume of interest generated by known methods according to the seismic data traces and velocity model. The seismic data traces are the result of a seismic survey conducted using a grid of sources and receivers with known positions overlaying a subsurface volume of interest. The volume of interest may include hydrocarbon (oil/gas) deposits. Common seismic surveys may use seismic sources such as explosives, air guns, and/or thumper trucks, and seismic receivers such as hydrophones and/or geophones. Each trace corresponds to a one source and one receiver location. A trace is a time-dependent amplitude of a seismic signal sensed by the receiver in response to a seismic pulse originating at the source. A wavefront originating at the source travels through the subsurface volume of interest and is reflected back toward the receiver by subsurface structures. In some embodiments, the input data is specified in SEG Y format, and trace coordinates are extracted from the SEG Y into a separate file. In some embodiments, the traces from the survey are collected and binned into groups that will be migrated together in beam-forming bins.

The input seismic data traces are processed as described below to generate an updated velocity model and updated image(s) of the subsurface volume of interest.

In a step 44, a set of beams is formed from the input data set, and migration (e.g. fast beam migration) is performed on the formed beams. The beams may be generated by known methods such as via Plane Wave Destructor (PWD) filters, as described for example by Popovici et al. in U.S. Pat. No. 9,594,176, "Fast Beam Migration Using Plane-Wave Destructor (PWD) Beam Forming," which is incorporated herein by reference.

FIG. 3-A shows an exemplary wavelet 64 forming part of a larger trace 62 according to some embodiments of the present invention. FIG. 3-B illustrates a number of locally-coherent seismic events (wavelets) 64 forming corresponding beams 80, according to some embodiments of the present invention. A beam 80 corresponds to a single spatial location and a range of times/depths. A plurality of locally-coherent events 64 at a particular spatial location, each corresponding to a different range of times/depths, forms a beam. In some embodiments, each locally-coherent event 64 is characterized by an arrival time, location, amplitude, orientation (dip), curvature, and spatial extent. In FIG. 3-B, amplitudes and event dips are denoted by the lengths and angles, respectively, of the lines representing events 64.

FIG. 3-C illustrates an event orientation (dip) 76 for a locally-coherent event 64. Consider three exemplary traces 62, 62', 62" adjacent in space, shown in FIG. 3-C. The vertical direction denotes time (or depth), while the signal deviation along the horizontal axis denotes the amplitude recorded by the receiver at the corresponding time/depth. Traces 62, 62', 62" include corresponding reflection events 68, 68', 68" characterized by higher amplitudes than previous and subsequent time points along the corresponding trace. Reflection events 68, 68', 68" can be fit to a line 74, which defines a local wavefront orientation (dip). The angle 76 between line 74 and the horizontal 72 defines the local slope or dip.

FIG. 4-A-B shows a number of exemplary beams 80a-b according to some embodiments of the present invention. FIG. 4-A shows a number of five-trace (across 1-D) beams 80a, while FIG. 4-B shows a number of twenty-five-trace (across 1-D) beams 80b. Only some of the beams are plotted, in order to delineate each beam. The example data (Claerbout, J. and Brown, M., 1999, "Two Dimensional Textures and Prediction-Error Filters," $61^{st}$ Mtg. Eur. Assoc. Expl. Geophys., Extended Abstracts, Session 1009) shows a synthetic model, which resembles sedimentary layers with a plane unconformity and a curvilinear fault. Using five-trace beams allow reducing the input data by a factor of five, while using twenty-five trace beams allows reducing the input data by a factor of twenty-five. A data reduction by a factor of five is generally invertible, i.e. the original trace data can be obtained from the beams without significant precision loss. A larger reduction is generally not invertible; the original data cannot be fully recovered from the data beam. At the same time, at larger data compression rates, the beam-forming process averages out more noise while retaining the coherent energy in the data, yielding increased signal-to-noise ratios (SNR). An improved SNR reduces the presence of image artifacts and makes images easier to interpret in complex areas.

In some embodiments, after migration of the formed beams is completed, each of the resulting depth migrated beam contains the following information (among others): seismic wavelet, beam correlation point, reflection angle, and structural plane. The seismic wavelet includes a time signature of the event that is imaged. The beam correlation point is the (x,y,z) point in the subsurface locating the structure that the beam is imaging. The reflection angle is the angle at which the seismic waves reflected from the structure. The structural plane is defined by the x and y dips of the subsurface structure, equivalent to the tangent plane to the structure at the reflection point.

The set of migrated beams is used to update the initial velocity model via a beam tomography method as described below.

Conventional Migration Velocity Analysis (MVA) methods have been used to improve the velocity model associated with a survey in order to create an accurate image of subsurface structures. After seismic data has been migrated through its current interval velocity model, the consistency of the model with the data is assessed by examination of the moveout in Common Image Gathers (CIGs), which represents variation over different wave paths in the predicted depth of sub-surface reflection events. The moveout is quantified through Moveout Analysis, which associates one or more velocity residual values with each image point, indicating whether the velocity in parts of the overburden visible to that image point is too high or too low.

Reflection tomography is an iterative inversion method that updates the velocity model and minimizes the deviation in the CIGs from a flat event. The method selects special image points called back-projection points, from which it traces rays back to the surface in order to distribute the velocity residual values throughout the image. Rays from different back-projection points illuminate parts of the subsurface and an appropriate compromise between velocity residuals coming from different rays is made by solving a least-squares problem. Mathematically speaking, the following equation is solved to obtain an update to the current velocity model:

$$L\Delta S = \Delta t \qquad (1)$$

where L is a sparse matrix that contains information about the ray paths, $\Delta\tau$ is the travel-time residual vector, and $\Delta s$ is the update to the slowness (reciprocal of velocity) that must be solved for. This matrix equation can be solved in the sense of least-squares. There are multiple additions and improvements that can be added in this stage, including regularization, velocity constraints, horizons, well-log data, and others.

Seismic imaging methods generally rely on redundancy in the seismic data in order to generate a seismic image. For each pair of source and receiver the recorded trace can only tell us their temporal separation from the reflector, but cannot give us the reflectors exact spatial location even if we have the exact velocity model. The way to localize reflectors is then to correlate the information from many traces. In most imaging methods, this correlation is done on the image side. For example, in Kirchhoff migration, an image is generated for every trace by spreading its energy within the image volume according to the travel time. The images from many traces are stacked together and interfere constructively and destructively with each other producing an image of the subsurface reflectors. Beam based migrations aim to perform much of the correlation on the data side rather than on the image side.

In a group of traces which have sources and receivers close to each other, the recorded wavelet associated with a reflector will appear in all of the traces with a small time shift as the source and receiver locations vary. This time shift is the four dimensional dip of the event. The four dimensions correspond to the receiver (x, y) and source (x, y) positions on the surface. Once we have determined the four dimensional dip of the event, we have additional information that we can use during the migration stage. Fast beam migration, unlike Kirchhoff migration, does not need to spread the energy of the event within the entire image volume according to the travel time. Instead, it uses the dip information to limit the part of the image domain within which the energy is spread, as illustrated in FIG. 5. FIG. 5 depicts the difference between Kirchhoff migration (shown at 500) and fast beam migration (shown at 502) in how energy is spread. In Kirchhoff migration, for a given source-receiver pair, multiple rays from source to receiver are used to image a given reflective surface. In fast beam migration only two rays are used: one from the source and one from the receiver.

The added efficiency from spreading the energy within only a small part of the image domain in fast beam migration is clear. However, this efficiency comes at the expense of analyzing the pre-stack data in order to obtain dip information. The advantage of analyzing pre-stack data is that this analysis is independent of migration velocity. Once the dips have been estimated, they do not need to be recomputed as the velocity model is improved and refined.

An exemplary beam migration work flow comprises beam forming (described above), followed by depth migration and image forming. The beam forming stage produces beams from the seismic data. In some embodiments, a beam includes a wavelet characterizing an event, the source and receiver dip, the events recording time, and the beam source and receiver coordinates, and possibly other attributes such as curvature. Depth migration takes this beam information and migrates the event to its proper subsurface location at which point it can be imaged in the image forming stage.

Depth migration uses ray tracing in the current velocity model to migrate the events. In addition to the standard seismic ray tracing (which propagates the position and the direction of the waves), the beam ray tracing can also propagate the curvature of the wave field. This allows for a more accurate reconstruction of the travel time in the vicinity of a ray.

Figure 6:
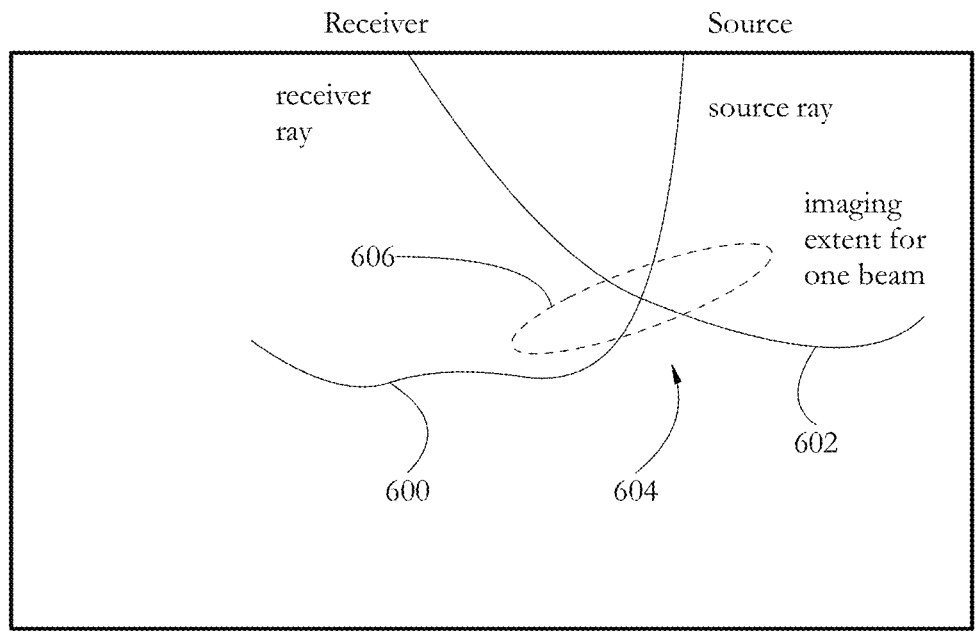
FIG. 6 shows an exemplary source-receiver correlation point and corresponding wavelet extent according to some embodiments of the present invention.

FIG. 6 depicts the correlation of a beam source ray 600 and receiver ray 602 that meet at a correlation point 604. The correlation point 604 is a point common to both rays, such that the travel time from the source to this point along the source ray 600 and the travel time from the receiver to this point along the receiver ray 602 sum to the recording time of the seismic event.

In the image forming stage, a seismic image is generated from the migrated beams. After the migration module has placed the beams in their correct locations, the image forming module spreads the seismic event energy within the image volume. The extent of the image of a single beam overlain on the velocity model is schematically illustrated at 606 in FIG. 6.

Beam tomography uses components of beam migration and traditional travel time tomography to create a computationally efficient velocity model building method. Generally speaking, the depth migration stage of beam migration can be used to produce the matrix L used in the tomographic equation (1), as well as the necessary traveltime residuals $\Delta\tau$. In traditional tomography, the matrix L is formed by ray-tracing, which forms part of depth migration. In beam tomography, as described herein, the travel-time residuals may be derived by computing the necessary shift to align beams to each other so that they all image structures in the same place in the subsurface. In some embodiments, an image or image gathers are not required to be formed in order to perform a velocity model update. Such images or image gathers may be generated, however, for example for quality control (QC) purposes.

The following discussion may be better understood by considering the following technical background regarding ray discretization, travel-time linearization, and normalized maximal cross-correlation.

Ray Discretization

The travel time along a ray path $\Gamma$ is given by $$t(\Gamma) = \int_\Gamma s(x)dx, \quad (2)$$

where x is a point in 2 or 3 dimensional space and s is the slowness equal to the reciprocal of velocity, v(x).

In some embodiments, the space of interest is discretized, i.e. subdivided into separate discrete volumes or areas, etc. We will refer to the units of discrete space as voxels, since this discretization typically done by using a rectangular grid, but a rectangular discretization is not a requirement of the method in some embodiments. With such a discretization, the discretized version of slowness is a vector in m dimensional space, $s \in R^m$. The components of the vector s are denoted by si and each is value of slowness in the $i^{th}$ voxel. Thus, a discrete version of equation (2) may be written as $$\tau = \sum_{i=1}^{m} \gamma_i(s)s_i. \quad (3)$$

The vector $\gamma(s) \in R^m$ is a discretized version of the ray path $\Gamma$ and its entry $\gamma_i(s)$ contains the arc length of the ray path inside the $i^{th}$ voxel. Note that $\gamma$ is a sparse vector, meaning that most of its entries will be 0.

Figure 10:
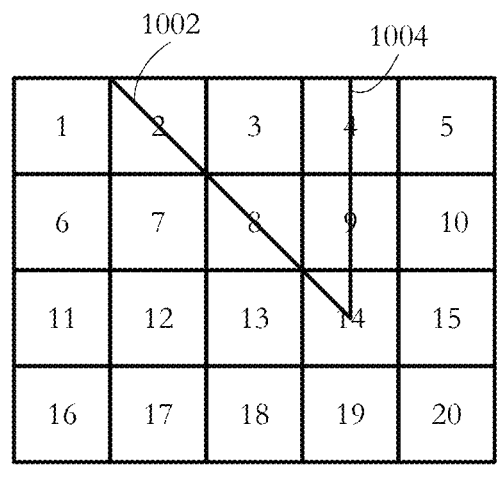
FIG. 10 shows a schematic 20-voxel array and schematic source and receiver raypaths through the voxel array according to some embodiments of the present invention.

An example is shown in FIG. 10, which shows an exemplary discretized space 1000 and corresponding schematic source and receiver rays 1002, 1004, respectively, passing through the space. The exemplary space has been discretized with a 4×5 grid and the voxels are numbered from 1 to 20. Each voxel is a square of size 1. Thus, the vector $\gamma \in R^{20}$ has entries:

$$\gamma=[0,\sqrt{2},0,1,0,0,0,\sqrt{2},1,0,0,0,0,0.5(1+\sqrt{2}),0,0,0,0,0,0] \quad (4)$$

Note that the non-zero entries are only 2, 4, 8, 9, and 14, which are the voxels that contain part of the source/receiver ray pair.

Ray Travel-Time Linearization

Equation (2) and its discretized version equation (3) are non-linear in slowness because the ray paths themselves depend on the slowness field. Considering small deviations of the travel-time $\Delta\tau$ and the slowness, $\Delta s$, with respect to a reference model so, with $s = s_0 + \Delta s$ we obtain $$\tau_0 = \sum_{i=1}^{m} \gamma_i(s_0)(s_0)_i \quad (5)$$

and $$\tau_0 + \Delta\tau = \sum_{i=1}^{m} \gamma_i(s_0 + \Delta s)(s_0 + \Delta s)_i. \quad (6)$$

When the deviation $\Delta s$ is small, i.e.

$$\gamma(s_0 + \Delta s) \approx \gamma(s_0), \quad (7)$$

we obtain the linearized perturbation equation $$\tau_0 + \Delta\tau = \sum_{i=1}^{m} \gamma_i(s_0 + \Delta s)(s_0 + \Delta s)_i \quad (8a)$$

$$\tau_0 + \Delta\tau \approx \sum_{i=1}^{m} \gamma_i(s_0)(s_0 + \Delta s)_i \quad (8b)$$

$$\tau_0 + \Delta\tau \approx \sum_{i=1}^{m} \gamma_i(s_0)(s_0)_i + \sum_{i=1}^{m} \gamma_i(s_0)(\Delta s)_i \quad (8c)$$

$$\Delta\tau \approx \sum_{i=1}^{m} \gamma_i(s_0)(\Delta s)_i \quad (8d)$$

$$\Delta\tau \approx \gamma \cdot \Delta s. \quad (8e)$$

Equation (8e) allows us to approximate the change in travel time along the ray, $\Delta\tau$, when we perturb the slowness by a small amount $\Delta s$, while still tracing the ray trajectory in the unperturbed slowness field $s_0$.

Normalized Maximal Cross-Correlation

Cross correlation between two non-zero discrete time signals, f and g, of length M is given by $$(f * g)[n] = \sum_{m=1}^{M} f[m-n]g[m], \quad (9)$$

where we extend f and g by 0 for element outside of 1 to M. A maximal normalized cross-correlation may be defined as $$C[f, g] = \frac{1}{2} + \frac{\max_n((f * g)[n])}{2\sqrt{\sum_{m=1}^{M}|f[m]|^2}\sqrt{\sum_{m=1}^{M}|g[m]|^2}}. \quad (10)$$

Note that by Holder's inequality, the maximal normalized cross-correlation is a number between 0 and 1.

In a step 46 (FIG. 2), a set of beam group relatedness parameters is received from storage or from a user, for example from a file or via a graphical user interface. In some embodiments, the beam relatedness parameters include a maximum inter-beam (correlation point) proximity, a maximum inter-beam dip deviation (difference), and a minimum inter-beam cross-correlation. In some embodiments, each parameter is constrained to be within a predetermined range, such as 50-400 m or 100-250 m for the maximum beam proximity, 0-15 degrees or 5-10 degrees for the maximum inter-beam dip deviation, and 80-100% or 85-95% for minimum inter-beam cross-correlation.

Figure 7:
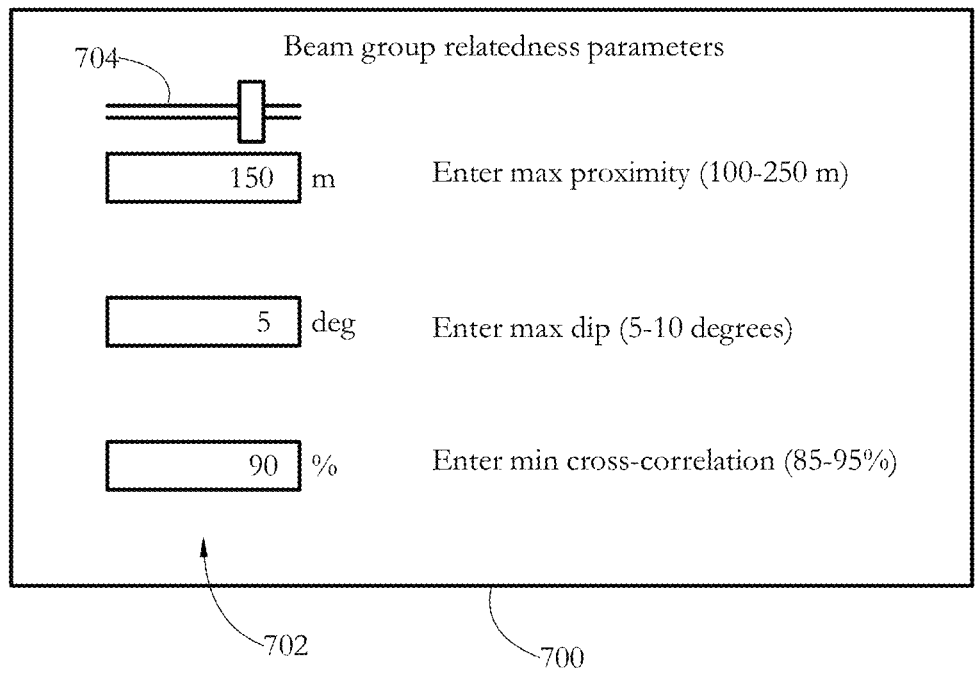
FIG. 7 shows an exemplary graphical user interface (GUI) suitable for receiving user input indicating beam group relatedness parameters according to some embodiments of the present invention.

FIG. 7 shows an exemplary graphical user interface (GUI) 700 suitable for receiving user input indicating group relatedness parameters. GUI 700 includes a set of user-editable alphanumeric fields 702, each configured to receive a corresponding group relatedness parameter numerical value. GUI 704 may also include one or more graphical fields such as a slider 704, configured to receive user input as a slider position corresponding to a given parameter value.

In a step 48 (FIG. 2), a set of beam groups is generated by grouping beams according to one or more group relatedness parameters, as described below. The beam groups are to be used later to generate a tomography matrix and corresponding residuals, as described in detail herein. Beam grouping is performed after beam forming/migration has been performed using the initial velocity model, in order to assemble groups of beams that image the same structure. Beams that image the same structure should place the structure in the same (x,y,z) location in the subsurface, and any discrepancies in location between beams are taken to be caused by errors in the velocity model.

In some embodiments, beam groups are assembled as follows. For each beam, referred to as the anchor/original (or $0^{th}$) beam, we search the other beams and find all beams that meet a relatedness condition. In some embodiments, beams that meet a relatedness condition have a similar beam correlation point, similar structural dip, and similar wavelet to tolerances defined in step 46. Similarity for the beam correlation point may be measured as a distance (e.g. 100 m). For the structural dip, similarity may measured as the angle between normals to the structural plane. Finally, wavelet similarity may be determined by normalizing maximal cross-correlation, as described below. In general, the normalized maximal cross-correlation varies from 0 to 1, and the user can specify a tolerance (minimum allowable cross-correlation) such as 0.9. In some embodiments, not all relatedness parameters described above need be used, and additional relatedness parameters may be defined. In some embodiments, each group of beams must contain at least one beam in addition to the original/anchor beam. If there aren't any additional beams that meet the relatedness condition(s), the original beam is discarded and not used for tomography. Thus, each beam group contains at least two beams.

Figure 8:
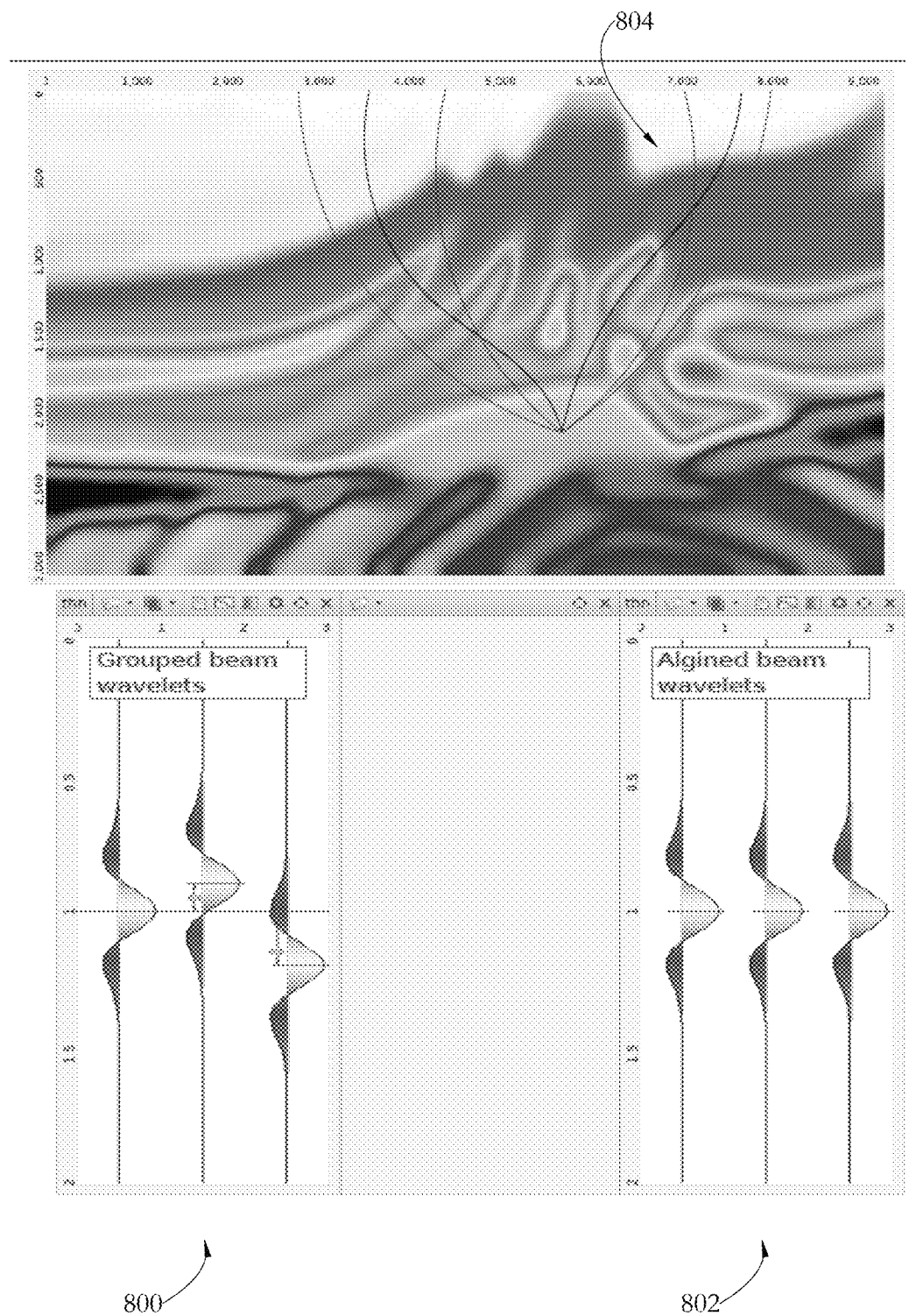
FIG. 8 shows exemplary rays through a velocity model and corresponding beam wavelets before and after alignment, according to some embodiments of the present invention.

In a step 50 (FIG. 2), the beams within each group are aligned in depth and/or time as illustrated with reference to FIGS. 8 and 9-A-B. FIG. 8 illustrates an exemplary set of grouped beam wavelets prior to alignment at 800 and after alignment at 802. Corresponding source-receiver ray pairs meeting at the group correlation point are shown in the upper panel at 804.

Figure 9:
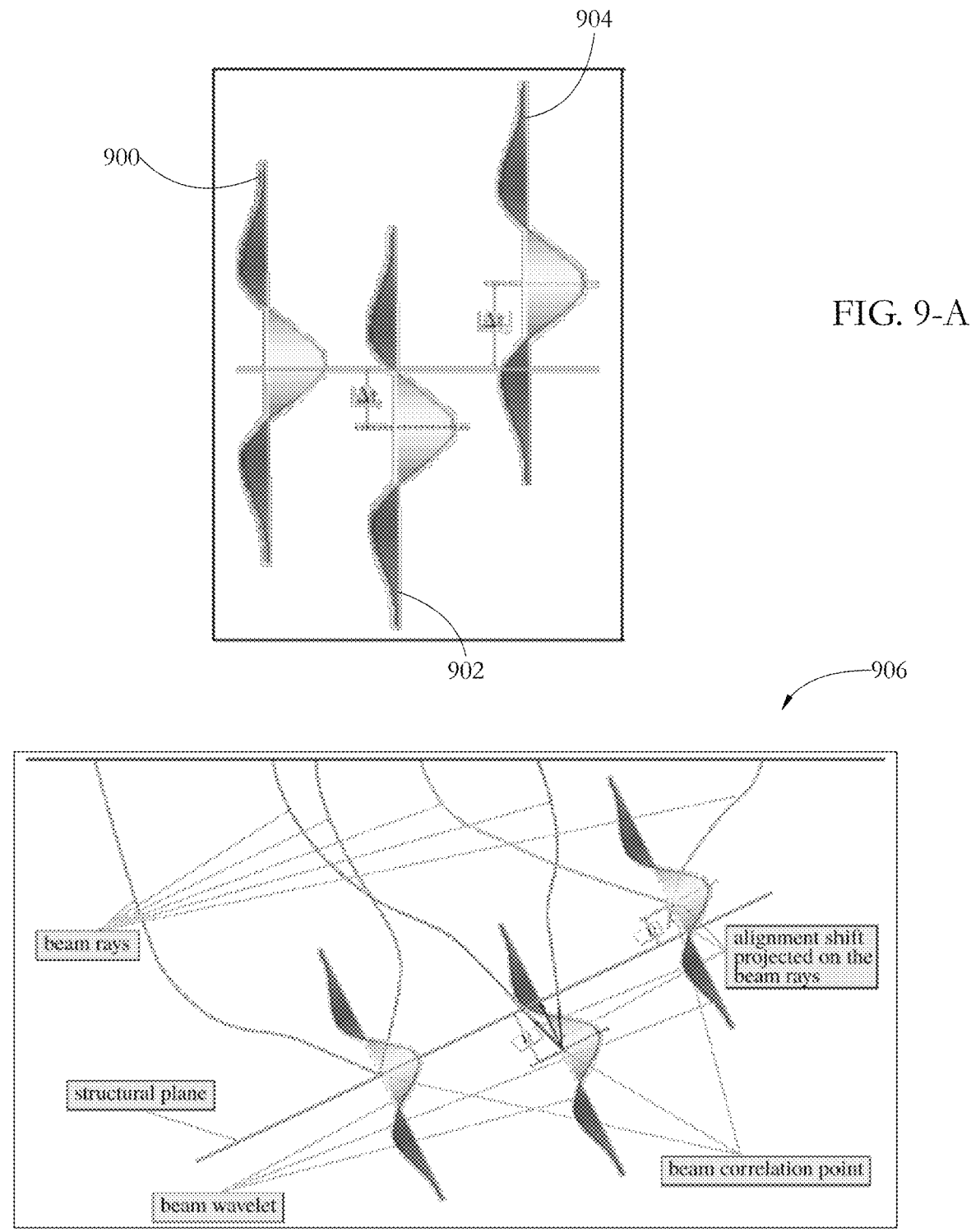
FIGS. 9-A-B illustrate beam wavelet shifts that align a group of three beams according to some embodiments of the present invention.

In some embodiments, for each beam group, the beam seismic wavelets are first aligned temporally to the wavelet of the original beam, as shown in FIG. 9-A. FIG. 9-A shows an exemplary anchor/original beam 900 and two additional beams 902, 904 which form part of the beam group defined by the anchor beam 900 and are temporally offset by anchor beam 900 by offsets $\Delta t$. The alignment can be carried out using cross-correlation, i.e. by determining a temporal shift that maximizes the cross-correlation between a given beam and the anchor beam. This alignment is performed because beam forming is not guaranteed to put the center of the beam wavelet at the same part of the seismic reflector signature. After the wavelets are temporally aligned as shown in FIG. 9-A, the wavelets are aligned to the reflection plane of the original beam, as shown at 906 in FIG. 9-B. FIG. 9-B shows a group of beams with their necessary shifts in space to align them with the reflection surface; the $j^{th}$ beam must be shifted by a distance $v_j$ in the direction perpendicular to the reflection plane.

Each beam is shifted by a distance $v_j$ in the direction perpendicular to the reflection plane, $n_j$. These space shifts can be converted to time shifts using the velocity to obtain the alignment shift, $\Delta\tau_j$, for the $j^{th}$ beam. This is the residual shift between the original beam and the $j^{th}$ beam. In terms of the discretized travel-time perturbation equation (8), we obtain $$\Delta\tau_j \approx w_j \gamma_j \cdot \Delta s - w_0 \gamma_0 \cdot \Delta s$$

$$\Delta\tau_j \approx (w_j \gamma_j - w_0 \gamma_0) \cdot \Delta s, \quad (11)$$

where $\gamma_k$ is the beam trajectory (which includes the source and receiver ray paths), $\Delta s$ is the perturbation of the slowness and $w_k$ are weights. The weights may be used since lengthening or shortening the ray paths will move the beam correlation point through a trigonometric identity, i.e. to project the $v_j n_j$ alignments onto the ray paths for each beam. Thus, $w_0 = \cos(\theta_0)$ and $w_j = v_j \cos(\theta_j)$, with $\theta_k$ the reflection angle for the $k^{th}$ beam.

In a step 52 (FIG. 2), a tomography matrix is generated as illustrated above with reference to FIG. 10. Equation (11) represents a single row of a larger matrix equation. For each group of beams, we get as many rows as there are beams in the group (minus the original beam). For the example in FIG. 9-A-B, there would be two matrix rows, one each for beams 902, 904. Collecting the rows from all of the groups and putting them in a single matrix, L, we obtain the tomographic linear matrix equation $$L\Delta s = \Delta\tau, \quad (12)$$

which is identical in form to equation (1). The above approach may be modified in various ways, for example by including adding row weights, summing the rows within a group to produce one row per group, summing neighboring groups into a single matrix row, or other modifications.

In a step 54 (FIG. 2), tomographic inversion is performed to update the velocity model of interest according to the tomography matrix. Updating the velocity model is performed by solving eq. (12) using known matrix equations solvers used in traditional tomography to determine Δs. Such matrix equation solvers may include various forms of regularization, velocity constraints, geologic fault constraints and other features. The slowness (or velocity) residuals are added to the original velocity model to yield the updated velocity model.

In a step 58 (FIG. 2), one or more seismic images of the subsurface volume of interest are generated using the updated velocity model and known imaging methods, such as fast beam migration.

In a step 60 (FIG. 2), one or more quality control (QC) procedures are performed in order to identify defects/artifacts in the generated image(s) and/or updated velocity model. In some embodiments, QC procedures may be performed at multiple points within the flow shown in FIG. 2. In particular, a QC step may be performed immediately after the velocity model is updated and before seismic image(s) are generated using the updated velocity model. In an exemplary QC step, a seismic image is created by spreading each event within the image volume at its migration location. The velocity model is checked for accuracy, for example with targeted common image gathers. If the velocity model is deemed accurate enough, it can be used for a final fast beam migration image or as the velocity model for other migration methods, such as Kirchhoff migration, reverse time migration, or Gaussian beam migration.

In some embodiments, the steps described above may be performed iteratively, with the updated velocity model serving as an initial velocity model for an additional pass through the described method.

FIGS. 11-A-D illustrate exemplary velocity models and associated images generated by beam tomography as described above. FIG. 11-A shows an exemplary initial velocity model 1100, while FIG. 11-B shows an exemplary image 1110 generated by performing fast beam migration according to the initial velocity model 1100. FIG. 11-C shows an updated velocity model 1120 generated by beam tomography as described above, while FIG. 11-D shows an updated image 1130 generated according to the updated velocity model 1120.

A comparison of FIGS. 11-C and 11-D reveals that the updated velocity model conforms to the imaged geological structure (see highlighted areas 1150, 1160), which provides confirmation that the updated velocity model is accurate. The same highlighted areas and other areas of FIG. 11-D also show evidence of improved imaging by showing a sharper image, with more finely defined and continuous structure. As a skilled artisan would appreciate, exemplary methods as described above allow producing improved seismic images with fewer defects/artifacts.

It will be clear to one skilled in the art that the above embodiments may be altered in many ways without departing from the scope of the invention. Accordingly, the scope of the invention should be determined by the following claims and their legal equivalents.

What is claimed is:

1. A seismic data processing method comprising employing a computer system including at least one processor to: generate a plurality of seismic data beams according to seismic trace data characterizing a subsurface volume;
for a selected beam of the plurality of beams, identify a beam group comprising the selected beam and a set of beams meeting a relatedness condition relative to the selected beam;
determine a set of relative inter-beam time or depth shifts that align the beam group in time or depth;
build a tomography matrix according to a plurality of relative inter-beam time or depth shifts determined for a plurality of corresponding beam groups;
perform a tomographic update of a velocity model characterizing the subsurface volume according to the tomography matrix to generate an updated velocity model for generating a seismic image of the subsurface volume; and
generate the seismic image of the subsurface volume according to the updated velocity model, thereby reducing imaging artifacts in the seismic image.

2. The method of claim 1, wherein the relatedness condition includes a beam proximity condition.

3. The method of claim 2, wherein the relatedness condition further includes a beam dip deviation condition.

4. The method of claim 3, wherein the relatedness condition further includes an inter-beam cross-correlation condition.

5. The method of claim 1, wherein the method further comprises employing a graphical user interface to receive user input setting at least one value for a set of relatedness condition parameters.

6. The method of claim 1, wherein a set of relatedness condition parameters includes a maximum inter-beam distance.

7. The method of claim 6, wherein the set of relatedness condition parameters further includes a maximum inter-beam dip deviation.

8. The method of claim 7, wherein the set of relatedness condition parameters further includes an inter-beam cross-correlation value.

9. The method of claim 1, wherein the set of inter-beam time or depth shifts are time or depth shifts relative the selected beam.

10. The method of claim 1, wherein the tomography matrix comprises a plurality of rows each representing a corresponding beam group, and a plurality of columns each representing a corresponding voxel in the subsurface volume, wherein each entry in the tomography matrix includes a traveltime delay encountered or a distance traveled by the corresponding beams within the corresponding voxel.

11. A non-transitory computer-readable medium encoding instructions which, when executed by a computer system cause the computer system to:
generate a plurality of seismic data beams according to seismic trace data characterizing a subsurface volume;
for a selected beam of the plurality of beams, identify a beam group comprising the selected beam and a set of beams meeting a relatedness condition relative to the selected beam;
determine a set of relative inter-beam time or depth shifts that align the beam group in time or depth;
build a tomography matrix according to a plurality of relative inter-beam time or depth shifts determined for a plurality of corresponding beam groups;
perform a tomographic update of a velocity model characterizing the subsurface volume according to the tomography matrix to generate an updated velocity model for generating a seismic image of the subsurface volume; and generate the seismic image of the subsurface volume according to the updated velocity model, thereby reducing imaging artifacts in the seismic image.

12. The computer-readable medium of claim 11, wherein the relatedness condition includes a beam proximity condition.

13. The computer-readable medium of claim 12, wherein the relatedness condition further includes a beam dip deviation condition.

14. The computer-readable medium of claim 13, wherein the relatedness condition further includes an inter-beam cross-correlation condition.

15. The computer-readable medium of claim 11, wherein the method further comprises employing a graphical user interface to receive user input setting at least one value for a set of relatedness condition parameters.

16. The computer-readable medium of claim 11, wherein a set of relatedness condition parameters includes a maximum inter-beam distance.

17. The computer-readable medium of claim 16, wherein the set of relatedness condition parameters further includes a maximum inter-beam dip deviation.

18. The computer-readable medium of claim 17, wherein the set of relatedness condition parameters further includes an inter-beam cross-correlation value.

19. The computer-readable medium of claim 11, wherein the set of inter-beam time or depth shifts are time or depth shifts relative the selected beam.

20. The computer-readable medium of claim 11, wherein the tomography matrix comprises a plurality of rows each representing a corresponding beam group, and a plurality of columns each representing a corresponding voxel in the subsurface volume, wherein each entry in the tomography matrix includes a traveltime delay encountered or a distance traveled by the corresponding beams within the corresponding voxel.

21. A computer system comprising at least one processor programmed to:

generate a plurality of seismic data beams according to seismic trace data characterizing a subsurface volume;

for a selected beam of the plurality of beams, identify a beam group comprising the selected beam and a set of beams meeting a relatedness condition relative to the selected beam;

determine a set of relative inter-beam time or depth shifts that align the beam group in time or depth;

build a tomography matrix according to a plurality of relative inter-beam time or depth shifts determined for a plurality of corresponding beam groups;

perform a tomographic update of a velocity model characterizing the subsurface volume according to the tomography matrix to generate an updated velocity model for generating a seismic image of the subsurface volume; and generate the seismic image of the subsurface volume according to the updated velocity model, thereby reducing imaging artifacts in the seismic image.

\* \* \* \* \*